(12) United States Patent
Brandwine et al.

(10) Patent No.: US 11,216,414 B2
(45) Date of Patent: *Jan. 4, 2022

(54) COMPUTER-IMPLEMENTED OBJECT MANAGEMENT VIA TAGS

(71) Applicant: Amazon Technologies, Inc., Seattle, WA (US)

(72) Inventors: Eric J. Brandwine, Haymarket, VA (US); Matthew T. Corddry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/804,889

(22) Filed: Nov. 6, 2017

(65) Prior Publication Data

US 2018/0067951 A1    Mar. 8, 2018

Related U.S. Application Data

(63) Continuation of application No. 12/588,839, filed on Oct. 29, 2009, now Pat. No. 9,836,466.

(51) Int. Cl.
*G06F 16/11* (2019.01)
*G06F 16/951* (2019.01)
*G06F 16/907* (2019.01)
*G06F 9/455* (2018.01)

(52) U.S. Cl.
CPC .......... *G06F 16/122* (2019.01); *G06F 16/907* (2019.01); *G06F 16/951* (2019.01); *G06F 9/45533* (2013.01); *G06F 9/45558* (2013.01); *G06F 2009/45562* (2013.01); *G06F 2009/45579* (2013.01)

(58) Field of Classification Search
CPC .. G06F 16/122; G06F 16/907; G06F 16/1844; G06F 16/24; G06F 9/451; G06F 2009/45562; G06F 2009/45579; G06F 9/45533; G06F 9/45558
See application file for complete search history.

(56) References Cited

U.S. PATENT DOCUMENTS

| | | | |
|---|---|---|---|
| 6,542,908 B1 * | 4/2003 | Ims | G06F 8/76 |
| 7,703,040 B2 | 4/2010 | Cutrell et al. | |
| 7,769,751 B1 * | 8/2010 | Wu | G06F 16/335 |
| | | | 707/728 |
| 7,814,409 B2 | 10/2010 | Bales et al. | |
| 7,934,170 B2 | 4/2011 | Fulcher et al. | |
| 8,024,324 B2 * | 9/2011 | Amitay | G06F 16/334 |
| | | | 707/715 |
| 8,180,813 B1 | 5/2012 | Goodson et al. | |
| 8,407,216 B2 | 3/2013 | Walker et al. | |

(Continued)

*Primary Examiner* — Marcin R Filipczyk
(74) *Attorney, Agent, or Firm* — Nicholson De Vos Webster & Elliott, LLP

(57) ABSTRACT

Systems and methods are provided for managing objects. In one implementation, a computer-implemented method is provided. The method includes receiving a query comprising a tag and executing the query. An object identifier is retrieved from a data table, based on the tag. The method further returns a result of the query. The result includes the object identifier that was retrieved from the data table. The method further performing an action related to an object having the retrieved object identifier.

18 Claims, 4 Drawing Sheets

(56) References Cited

U.S. PATENT DOCUMENTS

| | | |
|---|---|---|
| 2004/0261081 A1 | 12/2004 | Sen |
| 2007/0185858 A1 | 8/2007 | Lu et al. |
| 2008/0021876 A1 | 1/2008 | Ahem et al. |
| 2008/0065995 A1 | 3/2008 | Bell et al. |
| 2008/0177704 A1 | 7/2008 | Denney et al. |
| 2008/0244546 A1* | 10/2008 | Schmelter ........... G06F 11/3466 717/158 |
| 2008/0250388 A1 | 10/2008 | Meyer et al. |
| 2008/0288453 A1 | 11/2008 | Smetters et al. |
| 2009/0077124 A1 | 3/2009 | Spivack et al. |
| 2009/0112783 A1 | 4/2009 | Hargrave et al. |
| 2009/0260054 A1 | 10/2009 | Bryce et al. |
| 2010/0064293 A1* | 3/2010 | Kang .................. G06Q 10/109 718/104 |
| 2010/0198802 A1 | 8/2010 | Kraftsow et al. |
| 2011/0055559 A1 | 3/2011 | Li et al. |
| 2013/0073473 A1* | 3/2013 | Heath .................... G06Q 30/06 705/319 |
| 2013/0283263 A1* | 10/2013 | Elemary ............. G06F 9/45558 718/1 |
| 2014/0040964 A1* | 2/2014 | Hinners ........... H04N 21/42653 725/87 |
| 2015/0106806 A1* | 4/2015 | Reddy .................... G06F 16/24 718/1 |
| 2016/0267294 A1 | 9/2016 | Weissman et al. |

* cited by examiner

My-Account — 210
200
214 — TAG

| OBJECT IDENTIFIER | TAG |
|---|---|
| 12345 | Beta |
| 789012 | Storage:archive |
| 56432 | Storage:temporary |
| 124810 | Secret |
| 37569 | Replicating |
| 24931 | Maintenance |

COMPUTER-IMPLEMENTED OBJECT MANAGEMENT VIA TAGS

BACKGROUND

In a computer infrastructure service, such as a cloud computing service, dynamically scalable resources are provided as services over the Internet. For example, a provider of a cloud computing service typically supplies a developer with computers on which the developer can run applications. The developer can then upload applications, libraries, data, and associated configuration settings to a storage repository and, using a Web services interface, the developer can request a number of resources (e.g., virtual machines), on which the developer can load the applications. The resources may provide a particular level of central processing unit (CPU) capacity. Furthermore, the developer may increase or decrease how much CPU and storage capacity is needed to run the applications.

The number of users of these kinds of services, such as cloud computing services, has increased at a rapid rate. Furthermore, these users are storing a greater number of objects and a wider variety of object types than ever before. As a consequence of this growth, classifying and identifying objects is a significant challenge for users and providers alike. For example, although objects are associated with identifiers, the identifiers do not provide any context as to what the objects are or how the objects are to be managed. To use the identifiers in any meaningful way to manage the objects, users would need to build automated management frameworks that are specific to their needs and objects. A user might need to build many management frameworks to access objects for desired purposes. However, it would be time consuming, expensive, and ultimately unrealistic to expect users to build large numbers of automated management frameworks.

It also would be time consuming and expensive for a provider to build automated management frameworks, because each user may have unique needs and may implement different policies to manage and classify objects. Furthermore, as providers add new services and users add new objects, the attributes of cloud object types have become more complex. As a consequence, it is virtually impossible for a provider to have sufficient knowledge of the type of objects that users have or how the users might wish the provider to assist in the management of the objects.

One way to facilitate interactions between users, providers, and objects is through the use of certain application programming interfaces (APIs), which providers make publically accessible to users. However, due to rapid growth of objects and the sheer magnitude of the different types of user objects, continuously updating these public APIs every time a new attribute, object, or service becomes available would be cumbersome for the provider and confusing to the users. Therefore, there is a need for improved systems and methods that address the above problems.

BRIEF DESCRIPTION OF THE DRAWINGS

The accompanying drawings, which are incorporated in and constitute a part of this disclosure, illustrate various disclosed embodiments. In the drawings:

FIG. 2 shows an example of a data table storing examples of object identifiers and associated tags;

DETAILED DESCRIPTION

Figure 1:
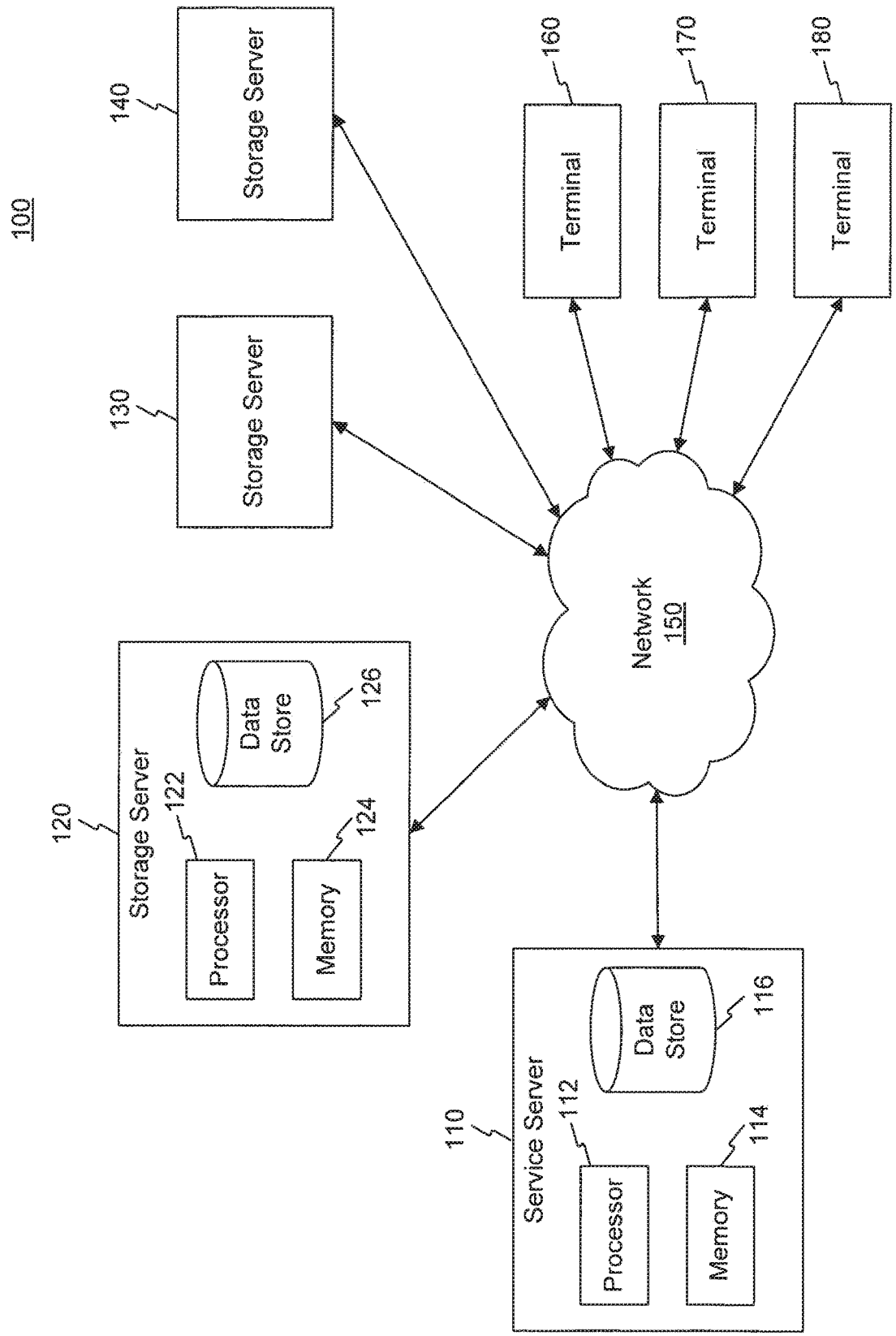
FIG. 1 is a diagram of an example of a system for using tags to identify and manage objects in a storage area network.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding blocks to the disclosed methods. Accordingly, the following detailed description is not limiting of the disclosed embodiments. Instead, the proper scope is defined by the appended claims.

Disclosed embodiments provide systems and methods that facilitate the use of tags to identify traits or behavior that is expected of cloud objects. As the terms are used herein, an "object" refers to a resource that has an identifier and a "tag" is an arbitrary, unstructured, non-hierarchical piece of metadata that is associated with an object. In some embodiments, a tag may be embedded in a object. A "resource" may constitute any data structure, virtual machine, physical machine, storage repository, queue, network component, volume, snapshot, or application container. The lack of a defined structure is part of the usefulness of tagging, because individuals can establish their own conventions for using tags and can manage their objects as deemed appropriate.

The following discussion demonstrates several benefits of using tags in a computer infrastructure services environment for management purposes. For example, a computer infrastructure services provider may store internal metadata as tags, making management tools easier to write and use. Tags provide a convention for storing metadata regarding objects because a variety of information (e.g., user specific, internal state, and private data of the computer infrastructure services provider) may be stored using the same mechanism. Additionally, tag queries may refer to multiple sources of data in a single query without multiple API requests. Accordingly, any resources, such as virtual machines, storage locations, queues, or physical servers, for example, can be selected based on internal metadata, user-supplied data, a current state, or a combination of the above through the use of tags that are associated with cloud objects.

Consistent with a disclosed embodiment, a computer-implemented method is provided for managing an object in a computer infrastructure services environment. The method may include receiving a request for a service to associate a tag with the object. The request may comprise parameters including a tag for the object and an object identifier of the object. The method may further store the tag and the object identifier in association with each other in a data table. The data table may reside in a data store. The method may further include receiving a query comprising the tag and executing the query. The method may retrieve the object identifier from the data table, based on the tag, and return a result of the query. The result may include the object identifier that was retrieved from the data table. The method may further include performing an action related to the object having the retrieved object identifier.

Consistent with another disclosed embodiment, a computer-implemented method is provided for managing objects. The method may receive a query comprising a tag and execute the query. The method may further retrieve an object identifier from a data table, based on the tag, and return a result of the query. The result may include the object identifier that was retrieved from the data table. The method may further include performing an action related to an object having the retrieved object identifier.

Consistent with yet another disclosed embodiment, a system is provided for managing object. The system may include a processor for executing program instructions and a memory storing the program instructions. The program instructions, when executed by the processor, may perform a process. The process may include receiving a query comprising a tag and execute the query. An object identifier may be retrieved from a data table, based on the tag. A result of the query comprising the object identifier that was retrieved from the data table may be returned and action may be performed that is related to an object having the retrieved object identifier.

Consistent with other disclosed embodiments, computer-readable storage media may store program instructions, which when executed by a processor, perform any of the methods described herein.

FIG. 1 is an example of a system 100 for using tags to identify and manage objects in a storage area network, consistent with a disclosed embodiment. System 100 may provide functionality for adding, removing, and/or querying tags that are associated with objects. Furthermore, objects may be used to identify, for example, resources such as virtual machines, volumes, snapshots, physical servers, etc. The functionality may be provided through a user interface or an application programming interface (API) that requests various tagging services from service server 110.

As shown in system 100, service server 110, storage servers 120-140, and terminals 160-180 are connected to a network 150. One of skill in the art will appreciate that although one service server, three storage servers, and three terminals are depicted in FIG. 1, any number of these components may be provided. Furthermore, one of ordinary skill in the art will recognize that one or more components of system 100 may be combined and/or divided into sub-components. For example, functionality provided by service server 110 may be combined with one or more of storage servers 120-140.

Network 150 provides communications between the various components in system 100, such as service server 110, storage servers 120-140, and terminals 160-180. In addition, service server 110, storage servers 120-140, and/or terminals 160-180 may access legacy systems (not shown) via network 150, or may directly access legacy systems, data stores, or other network applications. Network 150 may be a shared, public, or private network, may encompass a wide area or local area, and may be implemented through any suitable combination of wired and/or wireless communication networks. Network 150 may further comprise an intranet or the Internet.

Service server 110 may comprise a general purpose computer (e.g., a personal computer, network computer, server, or mainframe computer) having one or more processors (not shown) that may be selectively activated or reconfigured by a computer program stored in memory (not shown). Service server 110 may be implemented in a distributed network, such that service server 110 may communicate via network 150 with additional service servers (not shown). Alternatively, service server 110 may be specially constructed for carrying-out methods consistent with disclosed embodiments.

Service server 110 may include a processor 112, a memory 114, and a data store 116. Memory 114 may comprise one or more memory or storage devices that store data as well as software. Memory 114 may also comprise, for example, one or more of RAM, ROM, magnetic storage, or optical storage. Memory 114 may store program modules that, when executed by processor 112, perform one or more processes for enabling access to data residing on data store 116. Data store 116 may include one or more data tables. Data tables may associate object identifiers with tags. For example, a data table may relate to a storage location, such as an account, that is located on one of storage, servers 120-140.

In operation, service server 110 may coordinate operations of various tagging services. For example, service server 110 may allow users at terminals 160-180 to access the services to add, modify, remove, or query tags that are associated with objects that are stored in one or more of storage servers 120-140. Adding, modifying, removing, and/or querying tags may be controlled by permissions that specify users who are able to add, modify, remove, or query tags. Furthermore, tags can be added, modified, or removed from association with a single object, a group of objects, or a tag may be associated with a query result set. Such functionality may be accessible by users of terminals 160-180 through an application program interface (API) of a Web service or via a user interface. For example, service server 110 may provide one or more APIs that support interactions between terminals 140-160 and service server 110. The APIs may define parameters for certain interactions between terminals 140-160 and may also define return values for the interactions. For example, the ability to query the tags for a resource executing on behalf of a user may be accessible via a metadata service that provided by service server 110. Furthermore, a user may submit a query to a service in order to discover existing tags. Still further, service server 110 may examine tags of certain users to determine how the users are making use of their objects.

Consistent with disclosed embodiments, tags may have certain permissions that control access to tags and limit changes to existing tags. Furthermore, the use of namespaces, reserved prefixes, or a list of reserved tags are consistent with disclosed embodiments. Although tags may originate from users, in some embodiments, other sources may provide tags, such as a computer infrastructure services provider. Furthermore, certain sources of tags may have specific access control restrictions.

Storage servers 120-140 may each comprise a general purpose computer (e.g., a personal computer, network computer, server, or mainframe computer) having one or more processors that may be selectively activated or reconfigured by a computer program. Storage servers 120-140 may be implemented in a distributed network. For example, storage servers 120-140 may communicate via network 150 with additional storage servers (not shown), which may enable storage servers 120-140 to distribute processes for parallel execution by a plurality of storage servers. Collectively, storage servers 120-140 (and any additional storage servers) may comprise a storage area network (SAN). Alternatively, storage servers 120-140 may be specially constructed for carrying-out methods consistent with disclosed embodiments.

Storage server 120 may include a processor 122, a memory 124, and a data store 126. Memory 124 may comprise one or more memory or storage devices that store data as well as software. Memory 124 may also comprise, for example, one or more of RAM, ROM, magnetic storage, or optical storage. Memory 124 may store program modules that, when executed by processor 122, perform one or more processes for storing and/or accessing data residing on data store 126. Although not depicted in FIG. 1, storage servers 130 and 140 may include components that are equivalent to that of storage server 120.

Data store 126 may comprise a plurality of storage devices, such as disk storage devices, optical storage devices, etc. For example, data store 126 may comprise multiple disk drives that combine to form a disk array. The disk array may include, for example, a disk array controller, a cache, disk enclosures, and a power supply. The disk array controller may connect to network 150 via a port (not shown), which may serve as an interface between the disk array controller and network 150.

Storage server 120 may host various objects, including data for Internet sites, and may provide functionality for authenticating users and providing access to the objects. For example, data store 126 may store pages that are displayable by a computer executing software, such as an Internet browser. Storage server 120 may allow users at, for example, terminals 102-106 to access Internet sites being hosted by storage server 120. Furthermore, storage server 120 may allow providers of Internet sites (e.g., developers, site administrators, etc.) or other applications that are hosted by storage server 120 to access, modify, and load objects onto storage server 120. These users may access storage server 120 over network 150 through an Internet browser or software application running on any one of terminals 160-180.

Storage server 120 may transmit a document (e.g., a JavaScript Object Notation (JSON) document, an Extensible Markup Language (XML) document, or a web page) that is accessible by an Internet browser executing on one of terminals 160-180. The document may include options for a user to log onto a secure site provided by storage server 110. For example, users may log onto a secure site provided by storage server 110 by supplying credentials, such as a username and a password. Because the Internet site may use a secure communication environment, such as an HTTPS (hypertext transfer protocol secure) environment to transfer data over network 150, data transfer is assumed to be secure.

Terminals 160-180 may be any type device for communicating with service server 110 and/or storage server 120 over network 150. For example, users of terminals 160-180 may access and/or receive data from service server 110 and/or storage server 120. Terminals 160-180 may be personal computers, handheld devices (e.g., PDAs, cellular phones, etc.), or any other appropriate computing platform or device capable of exchanging data with network 150. Terminals 160-180 may each include a processor (not shown) and a memory (not shown). Furthermore, terminals 160-180 may execute program modules that provide one or more graphical user interfaces (GUIs) for interacting with network resources, such as service server 110 and/or storage server 120. Alternatively, in other embodiments, users of terminals 160-180 may access data through other network mechanisms, such as through an application program interface (API) of a Web service. For example, service server 110 may provide one or more APIs that support interactions between terminals 140-160 and service server 110.

FIG. 2 is an example of a data table 200 for associating object identifiers and tags, consistent with a disclosed embodiment. As discussed above, data table 200 may be stored, for example, in data store 116 of service server 110. For the purposes of the following discussion, data table 200 is an example of a data table for a user having an account (e.g., an account named "my-account") for storing data on one of storage servers 120-140. However, data table 200 may store data pertaining to any entity that stores data on one or more of storage servers 120-140. Data store 116 may include additional data tables for other account. Furthermore, data tables may store data based on other classification schemes. For example, data tables may be organized based on object types, users, regions, volumes, etc.

As shown in FIG. 2, data table 200 includes a header 210, which identifiers a source or owner (e.g., the tags are for a user of "my-account"). Although header 210 is shown in FIG. 2, header 210 may be omitted in other embodiments. For example, an owner may be identified for one or more objects in a separate table. Data table 200 further includes an object identifier column 212 and a tag column 214. Object identifier column 212 may include identifiers of objects. Tag column 214 may include various tags that are associated with the identifiers. For example, as shown in FIG. 2, an identifier with a value of "12345" is associated with a "Beta" tag. Tags may also include prefixes, which may indicate that the tags are reserved (e.g., storage:archive and storage: temporary). For example, tags may relate to durability requirements of an object (e.g., whether an object is important). The meaning of reserved tags may be known to certain entities, such as a computer infrastructure services provider. Although a colon is shown in various examples discussed throughout, one of ordinary skill will recognize that any other prefix may be used to identify reserved tags (e.g., any other one or more characters may serve as a prefix, such as a backslash, etc.)

Tags may fall into other various categories. For example, categories of tags may include implicit tags, user supplied tags, or provider tags. For example, service server 110 may automatically assign an implicit tag to an object that relates to an inherent characteristic of the object. Service server 110 may automatically make the assignment for certain objects that are transferred from one of terminals 160-180 to one of storage servers 120-140. Implicit tags may be public or private. Any implicit information that is included in a tag may be used in a tag query. For example, public implicit tags may be queried by the user and private implicit tags may be queried by a service provider (e.g., a computer infrastructure services or storage provider).

In one embodiment, implicit tags may not be altered or removed, except by the automated infrastructure (e.g., by service server 110). Examples of public implicit tags may include an instance's type (e.g., "m1.small") an instance ID (e.g., "i-1ab3c4d"), or a type of an object (e.g., "storage: instance"). Private implicit tags may include a storage location, for example. Furthermore, implicit tags may be preceded by a reserved prefix (e.g., "storage:" is a prefix).

Service server 110 may receive user supplied tags from users of terminals 160-180 for objects stored in any of storage servers 120-140. A user supplied tag may be free-form and an authorized user may add or remove such a tag at any time for any reason. For example, a user supplied tag may tag an instance with the name of a primary administrator or a day of the week on which the instance was created.

A service provide may associate a provider supplied tag with an object and the provider may modify or remove the tag at a later time. Provider supplied tags may be visible to other users, but may only be added or removed by the service provider. For example, a provider may add a "degraded" tag to instances that are degraded or a "replicating" tag to an object that is being replicated. Provider supplied tags may be implemented using a reserved prefix (e.g., the reserved prefix may identify the name of the provider).

In disclosed embodiments, tags may be used as a bidirectional communications channel between users and a provider (e.g., a computer infrastructure services provider). For example, certain user supplied tags may have a predefined meaning. Applying these tags to objects may permit users to express to the provider how they want the computer infrastructure services provider to manage their objects. For example, these tags may be preceded by a reserved prefix, which may be service dependent. Tags may be used to communicate between users and the provide regarding storage classes, instance migration requirements, feature evaluations, and may be used to provide instance status and object status information. The following discussion provides examples of various interactions using tags. One of ordinary skill in the art will appreciate that the following are examples and other interactions are in keeping with the spirit and scope of disclosed embodiments. Furthermore, one of ordinary skill in the art will appreciate that, as tags do not need to follow any particular naming convention, the names of the tags in the following discussion are examples.

By tagging objects representing storage locations with a temporary tag (e.g., "storage:temporary," where the "storage:" prefix indicates that the tag is a reserved tag), a user may inform a provider that the user does not wish a particular storage location to be replicated. In exchange for a lower quality of service, the provider may charge the user a lower rate. Furthermore, applying a temporary tag may cause objects that are created in that storage location to inherit the tag. Alternatively, an archive tag (e.g., "storage:archive") may indicate a higher level of storage replication, such as to several servers representing different regions, which may carry a correspondingly higher cost.

Storage servers 120-140 may provide live migration of instances from one server to another. Some instances (e.g., database servers) may be critical to a user and migration may be preferable to sudden termination. Others instances (e.g., web servers) may be stateless and launching another instance may be easier than migrating a running instance. By tagging instances with an ephemeral tag (e.g., "cloud:ephemeral"), a user may indicate that, in the event of an impending hardware failure or a maintenance event, a provider may terminate instances with the tag instead of migrating the instances to another storage location. The provider may charge a user that elects to associate objects with this tag a lower charge, as the operational burden for the storage provider is decreased. Alternatively, a user may tag an instance with a fixed tag (e.g., "cloud:fixed") to indicate that an instance should not be migrated. Since these instances cannot be terminated, the provider may charge a higher fee.

Instead of launching instances via a new endpoint to test new functionality, a user may indicate that an instance should be placed in a beta fleet by tagging it with a predefined tag (e.g., "beta"). In other embodiments, a service provider may communicate status information regarding an object to a user. For example, a service provider may tag instances that are in a degraded state with a degraded tag (e.g., "degraded"). Furthermore, replication of data from a storage location may take a significant amount of time as replication will occur on an object by object basis. At the time a user makes a replication request, the objects in the storage location can be tagged with replicating tag (e.g., "replicating"), which may indicate that the objects are in the process of being replicated. As each object finishes replication, the tag may be removed. For example, the user may query the system to see how much progress has been made on a replication request.

Other examples of tags include a secret tag (e.g., "secret") for indicating that an object should be encrypted. Such a tag may have an associated policy. For example, an instance including credit card data may be tagged "secret" to ensure that the data is fully encrypted and the data is wiped from a storage location after a transaction has been processed. When encountering an object with such a tag, service server 110 may encrypt the data according to any appropriate encryption technique. A "preserve" tag may indicate that data having such a tag should be preserved during outages (e.g., failures, power outages, etc.). A "maintenance" tag may have an associated policy that indicates when maintenance may be performed on a resource. Furthermore, tags may used to indicate an order in which computers may be shut off (e.g., when air conditioning fails, turn off web servers first and databases last), or to specify a time of day that is good for a customer to lose service, etc.

Figure 3:
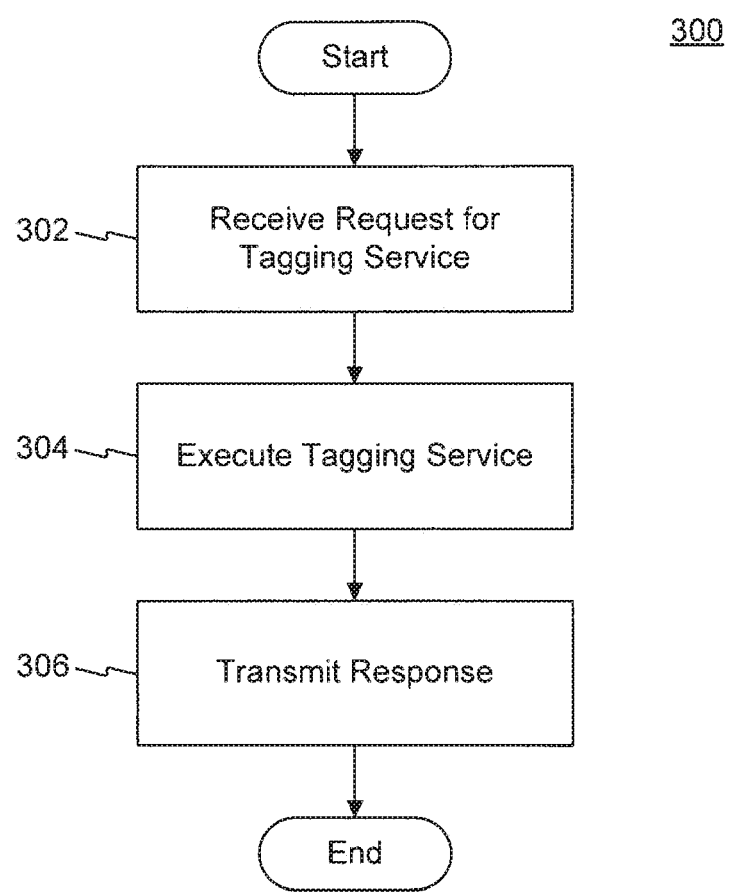
FIG. 3 is a flow diagram of an example of a routine for providing a tagging service for an object.

FIG. 3 is a flow diagram of an example of a routine 300 for providing a tagging service for an object, consistent with a disclosed embodiment. Routine 300 provides an overview of a process in which service server 110 associates a tag with an object, removes a tag that is associated with an object, or modifies a tag associated with an object.

Prior to the start of routine 300, a user may be authenticated by, for example, service server 110. For example, prior to the start of routine 300, service server 110 may transmit a document (e.g., a web page) that is accessible by an Internet browser executing on, for example, terminal 160. The document may include options for a user to log onto a secure site provided by service server 110. The user may log onto the secure site by supplying credentials, such as a username and a password. Once authenticated, routine 300 may begin. Alternatively, in other embodiments, routine 300 may begin when another service requests a tagging service. For example, as the term is used herein, a request for a service may encompass any direct or indirect mechanisms by which service server 110 or other software residing on terminals 160-180 provides information that invokes certain behavior in another software component.

In block 302, service server 110 may receive a request for a tagging service. For example, one of terminals 160-180 or another service may request an API for a tagging service (e.g., an add tag service, a remove tag service, or a modify tag service) and pass one or more parameters. As discussed above, the tagging service may associate tag with an object, remove a tag that is associated with an object, or modify a tag that is associated with an object.

To associate a tag with an object, the request for the service may include an identifier of an object and a tag name. For example, the request may be expressed as "AddTag (tag_name, objectID)." In other embodiments, the request for the tagging service may specify a batch (i.e., a plurality of objects) to which a tag should be associated.

To remove a tag that is associated with an object, the request may include a command to remove the tag and an object identifier. For example, the request may be expressed as "RemoveTag (remove_tag_command, objectID)." In other embodiments, the request for the tagging service may specify a batch (i.e., a plurality of objects) to which a tag should be removed.

To modify a tag that is associated with an object, the request may include a command to modify the tag, a new tag name, and an object identifier. For example, the request may be expressed as "ModifyTag (modify_tag_command, new_tag_name, objectID)." In other embodiments, the request for the tagging service may specify a batch (i.e., a plurality of objects) to which a tag should be modified.

In other embodiments, service server 110 may automatically generate a tag for certain objects when the objects are received by one of storage servers 120-140. For example, when one or more of storage servers 120-140 stores objects, service server 110 may automatically receive a request from another service to the add tag service for certain objects (e.g., objects that are of certain data types or that are being stored in certain storage locations).

In block 304, service server 110 may execute the tagging service. When a tag is associated with an object, the identifier of the object and the tag may be stored in a data table that is included in data store 116. For example, the identifier and tag may be stored in data table 200, as discussed above. When a tag is removed from association with an object, service server 110 may update data table 200 to remove the data reflecting the association of the tag and the object. When a tag is modified, service server 110 may update the tag that is associated with an object.

In block 306, service server 110 may transmit a response. The response may indicate a result of performing the service, such as an indication that the tag was successfully associated with an object, removed from association with an object, or an existing tag was modified. For example, service server 110 may return a response to one of terminals 160-180 or may return a response to a service that requested the tagging service.

Consistent with disclosed embodiments, a user of one of terminals 160-180 and/or service server 110 may query tags that have been associated with objects. For example, a user may query a list of objects that are associated with a certain tag and/or may perform logical operations (e.g., using logical operators such as "AND," "OR," and "NOT") using multiple tags. For example, a tag query may request data objects all having tags A, B, and C (e.g., a query for "tag_A AND tag_B AND tag_C"). The following are examples of tag queries, consistent with one or more disclosed embodiments.

As one example, a query may request all of a user's (e.g., user_123) resources in a particular location or region (e.g., us_east_1a). The query may be expressed as: QueryTag ("UserID:123 AND us_east_1a"). As another example, a query may request all instances for a user that are marked as degraded, but which the user has indicated cannot be migrated. The query may be expressed as "QueryTag ("storage:instance AND degraded AND NOT migratable").

Following a query, a tag may be added to objects that were identified in the query. For example, a "reserved" tag may be added to instances that are of a certain class (e.g., m1.small) in a certain location (e.g., us-east-1a) and that are already tagged with a "blue" tag. The query may be expressed as follows: QueryTag("m1.small AND us-east-1a AND blue") and the query may return a result (e.g., tag_result-1a2b3c4d). Following the query, a request may be made to the add tag service to add the "reserved" tag to the result. For example, the request may be passed parameters, as follows: "AddTag (tag_result-1a2b3c4d, reserved)".

Figure 4:
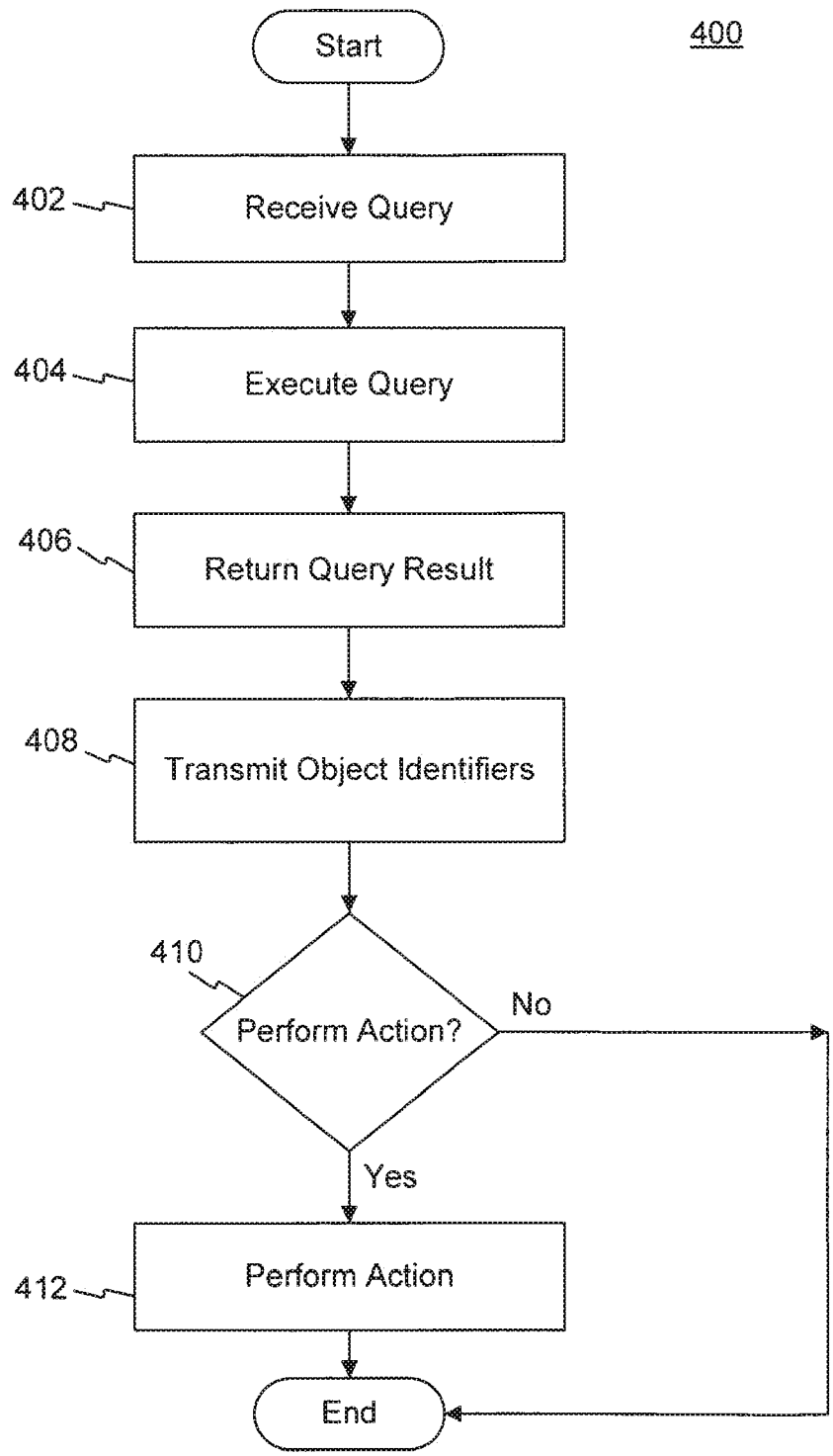
FIG. 4 is a flow diagram of an example of a routine for querying a tag associated with an object.

FIG. 4 is a flow diagram of an example of a routine 400 for querying a tag associated with an object, consistent with a disclosed embodiment. As part of routine 400, service server 110 may receive a query and identify objects that are associated with a tag that was specified by the query. Service server 110 may further take an action, such as performing a management function or operation, that is related to the identified objects. For example, the action that is related to the identified objects may affect a provider's behavior or the action that is related to the identified objects may involve communicating information or data from a provider to another entity (e.g., a user, a customer, a service, etc.).

In block 402, service server 110 may receive a query. For example, one of terminals 160-180 or another service may request an API for a query service and pass one or more parameters. In other embodiments, in block 402, service server 110 may receive the query from another service. As discussed above, the query may include parameters and logical operators (e.g., logical operators such as "AND," "OR," and "NOT").

In block 404, service server 110 may execute the query. For example, service server 110 may invoke a query service that evaluates the parameters that were received in block 402. As part of executing the query, service server 110 may access one or more data tables that are stored in data store 116.

In block 406, service server 110 may return a result of the query. For example, the result may comprise one or more object identifiers that were found to be in association with objects having tags that satisfied the query.

In block 408, service server 110 may transmit the object identifiers, for example, to one of terminals 160-180. Alternatively, in other embodiments, another service may receive the object identifiers as a response.

In block 410, service server 110 may determine whether to perform an action that is related to the identified objects. For example, the action may relate to the management of one or more objects having the object identifiers that were returned as a result of the query (e.g., the action may affect a provider's behavior). Alternatively, the action may include communicating information or data (e.g., transmitting status information concerning the identified objects to a user or a service). If service server 110 determines that an action should be performed, then routine 400 may proceed to block 412.

In block 412, service server 110 may perform an action. The action affect a provider's behavior or the action may involve communicating information or data from a provider to a customer. For example, the action may cause a new tag to be added to the object identifiers that were returned in the query. As another example, the action may communicate information pertaining to the durability requirements of an object (e.g., whether an object is important or is considered temporary or nonessential and may be deleted under certain conditions). As yet another example, the action may involve communicating information regarding events, such as emergencies or unexpected events. Furthermore, the action may be based on a meaning that is attributable to the tags that were included in the query. For example, certain reserved tags may have a shared meaning between entities, such as a user and a computer infrastructure services provider.

Other examples of actions that involve managing the one or more objects may include classifying instances of the object to not be replicated, terminating one or more instances of the object, migrating one or more instances of the object to another storage location, preventing migration of one or more instances of the object to another storage location, classifying one or more instances of the object for beta testing, classifying instances of the object as having a degraded state, classifying one or more instances of the object as being replicated, and encrypting one or more instances of the object. Furthermore, other examples of actions include altering a business process based on a tag, increasing or decreasing a cost of a resource based on a tag, applying a tag to change the attributes of a storage location, changing an encryption technique, or is used in designating a shut down sequence of devices (e.g., certain objects should be shut down before or after others based on a classification scheme). Service server 110 may communicate classifications and/or status information of the objects to a user or service via network 150.

As one of ordinary skill in the art will appreciate, one or more of blocks 302-306 and 402-412 may be optional and may be omitted from implementations in certain embodiments. Furthermore, functionality provided by one or more of blocks 302-306 and 402-412 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method comprising:
   allocating a virtual machine for use by a user;
   transmitting data to a device to cause a user interface for a tagging service of a computer services provider to be presented to the user, wherein the computer services provider executes and manages at least the virtual machine for the user;
   receiving, from the device at an application programming interface (API) associated with the tagging service, a request to associate a user-supplied tag with the virtual machine, the request being generated by the device based on an interaction of the user with the user interface, the request including the user-supplied tag and an identifier of the virtual machine, wherein the user-supplied tag comprises an alphanumeric string;
   storing, by the computer services provider in a data store, an association between the user-supplied tag and the virtual machine in a data store;
   receiving a query seeking a list of identifiers of computing resources associated with at least the user-supplied tag;
   transmitting a query result including the list of identifiers, the list including at least the identifier of the virtual machine; and
   performing, by the computer services provider, a management action on each computing resource identified in the list of identifiers.

2. The computer-implemented method of claim 1, wherein performing the management action comprises associating a second tag with each computing resource identified within the list of identifiers.

3. The computer-implemented method of claim 1, wherein performing the management action comprises terminating each computing resource identified within the list of identifiers.

4. The computer-implemented method of claim 1, wherein performing the management action comprises shutting down each computing resource identified within the list of identifiers.

5. The computer-implemented method of claim 1, wherein performing the management action comprises migrating each computing resource identified within the list of identifiers.

6. The computer-implemented method of claim 1 wherein performing the management action comprises blocking migration of each computing resource identified within the list of identifiers.

7. The computer-implemented method of claim 1, wherein performing the management action comprises associating a second tag with each computing resource identified within the list of identifiers, wherein the second tag is a provider supplied tag that may not be added or removed by the user, wherein the second tag indicates a state of the corresponding computing resource.

8. The computer-implemented method of claim 7, wherein the state of the computing resource indicates that the corresponding computing resource is in a degraded state or is in the process of being replicated.

9. The computer-implemented method of claim 8, further comprising removing the second tag from being associated with ones of the computing resources when the state of the corresponding computing resource changes.

10. The computer-implemented method of claim 1, wherein the query further includes an identifier of a particular location or region.

11. The computer-implemented method of claim 1 wherein:
    the query comprises one or more resource selection criteria, the one or more resource selection criteria including one or more logical operators and at least the user-supplied tag.

12. The computer-implemented method of claim 11, wherein the query identifies a virtual machine type.

13. The computer-implemented method of claim 1, further comprising:
   receiving a request to remove the user-supplied tag from being associated with the virtual machine; and
   updating the data store to remove the association between the user-supplied tag and the virtual machine.

14. A computer services provider system comprising:
   one or more hardware processors; and
   a memory with stored instructions that, when executed by at least one of the one or more hardware processors, cause the computer services provider system to:
   allocate a virtual machine for use by a user;
   transmit data to a device to cause a user interface for a tagging service of the computer services provider system to be presented to the user, wherein the computer services provider system executes and manages at least the virtual machine for the user;
   receive, from the device at an application programming interface (API) associated with the tagging service, a request to associate a user-supplied tag with the virtual machine, the request being generated by the device based on an interaction of the user with the user interface, the request including the user-supplied tag and an identifier of the virtual machine, wherein the user-supplied tag comprises an alphanumeric string;
   store, in a data store, an association between the user-supplied tag and the virtual machine;
   receive a query seeking a list of identifiers of computing resources associated with at least the user-supplied tag;
   transmit a query result including the list of identifiers, the list including at least the identifier of the virtual machine; and
   perform a management action on each computing resource identified in the list of identifiers.

15. The computer services provider system of claim 14, wherein the management action comprises, for each computing resource identified in the list of identifiers, one or more of:
   classifying the computing resource in a specified manner; or
   encrypting the computing resource; or
   terminating the computing resource; or
   migrating the computing resource; or
   performing a shut down sequence in a manner that affects the computing resource; or
   preventing migration of the computing resource.

16. The computer services provider system of claim 14 wherein the query comprises one or more resource selection criteria, the one or more resource selection criteria including one or more logical operators and at least the user-supplied tag.

17. A non-transitory computer-readable storage medium having stored instructions that, when executed by a computing services provider system comprising a processor, cause the computing services provider system to perform operations comprising:
   allocating a virtual machine for use by a user;
   transmitting data to a device to cause a user interface for a tagging service of a computer services provider system to be presented to the user, wherein the computer services provider system executes and manages at least the virtual machine for the user;
   receiving, from the device at an application programming interface (API) associated with the tagging service, a request to associate a user-supplied tag with the virtual machine, the request being generated by the device based on an interaction of the user with the user interface, the request including the user-supplied tag and an identifier of the virtual machine, wherein the user-supplied tag comprises an alphanumeric string;
   storing, in a data store, an association between the user-supplied tag and the virtual machine;
   receiving a query seeking a list of identifiers of computing resources associated with at least the user-supplied tag;
   transmitting a query result including the list of identifiers, the list including at least the identifier of the virtual machine; and
   performing a management action on each computing resource identified in the list of identifiers.

18. The non-transitory computer-readable storage medium of claim 17 wherein the management action comprises, for each computing resource identified in the list of identifiers, one or more of:
   classifying one or more instances of the computing resource for beta testing; or
   classifying one or more instances of the computing resource as being degraded; or
   classifying one or more instances of the computing resource as being replicated; or
   performing a shut down sequence in a manner that affects the computing resource; or
   preventing migration of one or more instances of the computing resource; or
   encrypting one or more instances of the computing resource; or
   terminating one or more instances of the computing resource; or
   migrating one or more instances of the computing resource.

* * * * *